Figure 1:
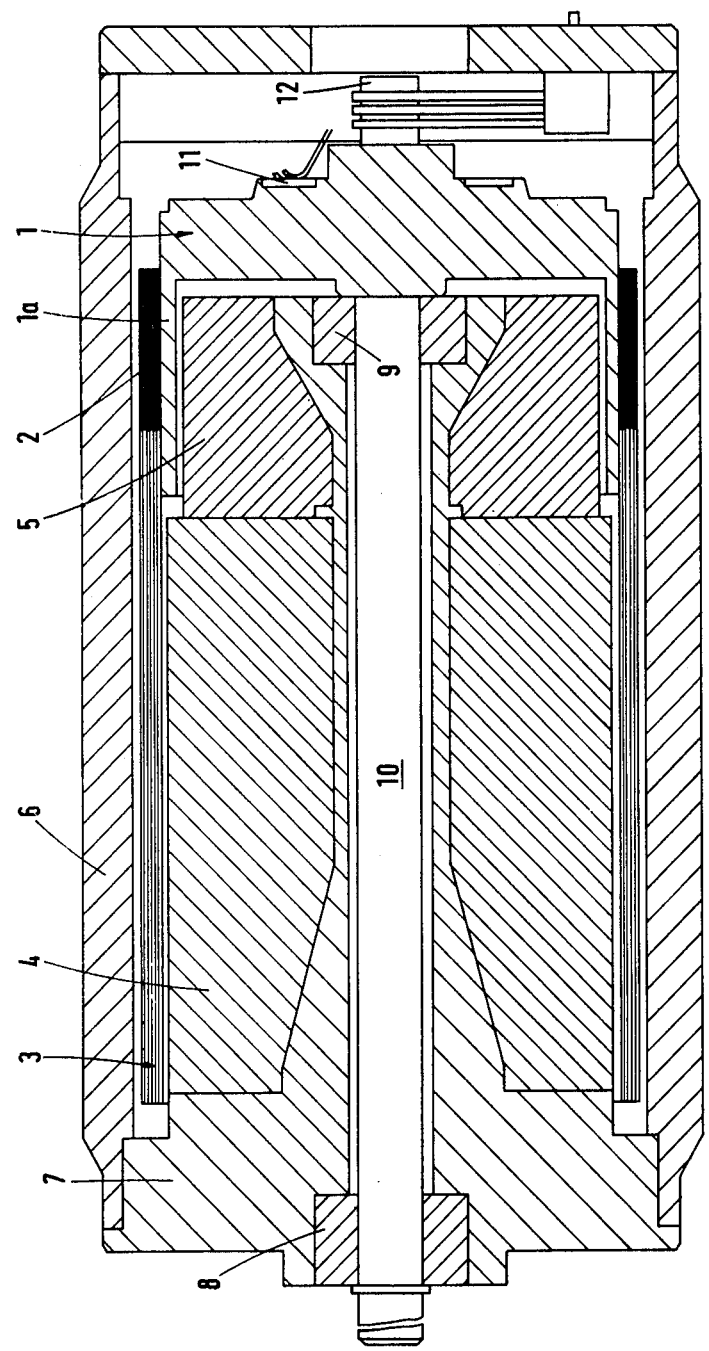

United States Patent [19]
Girardin

[11] 4,082,970
[45] Apr. 4, 1978

[54] DIRECT-CURRENT MOTOR-GENERATOR

[75] Inventor: Jean-Claude Girardin, La Chaux-de-Fonds, Switzerland

[73] Assignee: Portescap, La Chaux-de-Fonds, Switzerland

[21] Appl. No.: 708,425

[22] Filed: Jul. 26, 1976

[30] Foreign Application Priority Data

Aug. 12, 1975 Switzerland ............... 10457/75

[51] Int. Cl.² ................................ H02K 47/04
[52] U.S. Cl. ..................... 310/113; 310/138; 310/266
[58] Field of Search ........... 310/154, 266, 138, 113, 310/112, 268, 140, 171, 126

[56] References Cited

U.S. PATENT DOCUMENTS

| 396,355 | 1/1889 | Dyer | 310/266 X |
|---|---|---|---|
| 2,427,919 | 9/1947 | Mironowicz | 310/138 X |
| 2,458,507 | 1/1949 | Fox | 310/138 |
| 2,806,159 | 9/1957 | Sheldon | 310/113 |
| 3,109,114 | 10/1963 | Baudot | 310/268 |
| 3,290,528 | 12/1966 | Adler et al. | 310/266 |
| 3,641,376 | 2/1972 | Livingston | 310/113 |
| 3,648,090 | 3/1972 | Voin | 310/113 X |
| 3,909,645 | 9/1975 | Herr et al. | 310/138 |

*Primary Examiner*—Donovan F. Duggan
*Attorney, Agent, or Firm*—Cushman, Darby & Cushman

[57] ABSTRACT

A direct-current motor-generator comprises at least one stationary magnetic circuit including a permanent magnet and forming an air gap of substantially cylindrical shape, and a generally cup shaped rotor bearing a motor winding and a generator winding. The arrangement of the at least one magnetic circuit and the windings is such that the magnetic flux passing through the one of the said windings is separated in space from the flux passing through the other of the said windings.

9 Claims, 5 Drawing Figures

DIRECT-CURRENT MOTOR-GENERATOR

The present invention relates to direct-current machines and in particular to a direct-current motor-generator of the type comprising at least one stationary magnetic circuit including a permanent magnet and forming an air gap for receiving a motor winding and a generator being part of a generally cup-shaped rotor.

In machines of this type the arrangement of both of the windings, the motor- and the generator winding on a common rotor eliminates changes of the relative angular position of separated rotors as well as mechanical resonances which can occur in machines with separated rotors at high accelaration or deceleration. However, when using a common rotor another problem arises which is related to the inductive coupling between the different windings. In known motor-generators the motor- and the generator winding are placed one over the other or one next to the other in such a way that current changes in the motor winding, as they occur mainly at the time of commutation, induce strong interfering voltages in the generator winding. This effect is very troublesome and represents a serious inconvenient of this kind of machine.

It is therefore a main object of the invention, to provide a direct-current machine of the kind having a motor- and a generator winding, in which the inductive coupling between both of these windings is practically eliminated.

In accordance with the invention, this is obtained by arranging the motor- and the generator windings as well as the stationary magnetic circuit in such a manner that the magnetic flux passing through one of the windings is separated in space from the magnetic flux passing through the other of the said windings.

In accordance with one embodiment of the invention, both windings are realised as cylindrical coils fixed on the rotor in axially contiguous relationship. The rotor is provided with a flange having a tubular axial extension which bears the generator winding and an adjacent part of the motor winding. These windings can be born by the outer or the inner surface of the tubular extension. The stationary magnetic circuit has parts placed on either side of the rotor in radial direction, which parts are adapted to form an air gap which provides a constant radial clearance for the rotor over substantially the whole axial extension of the windings.

According to another embodiment of the invention, both windings are arranged coaxially in radially spaced relationship so as to form a double-walled cup-shaped rotor. A tubular part of the stationary magnetic circuit is lodged in the tubular space between the windings and forms two air gaps with respective parts of the magnetic circuit disposed the one inside the rotor and the other outside the rotor.

In the motor-generator according to the invention, two separated permanent magnets can be provided to form two stationary magnetic circuits, one cooperating with the motor winding and the other with the generator winding.

Figure 2:
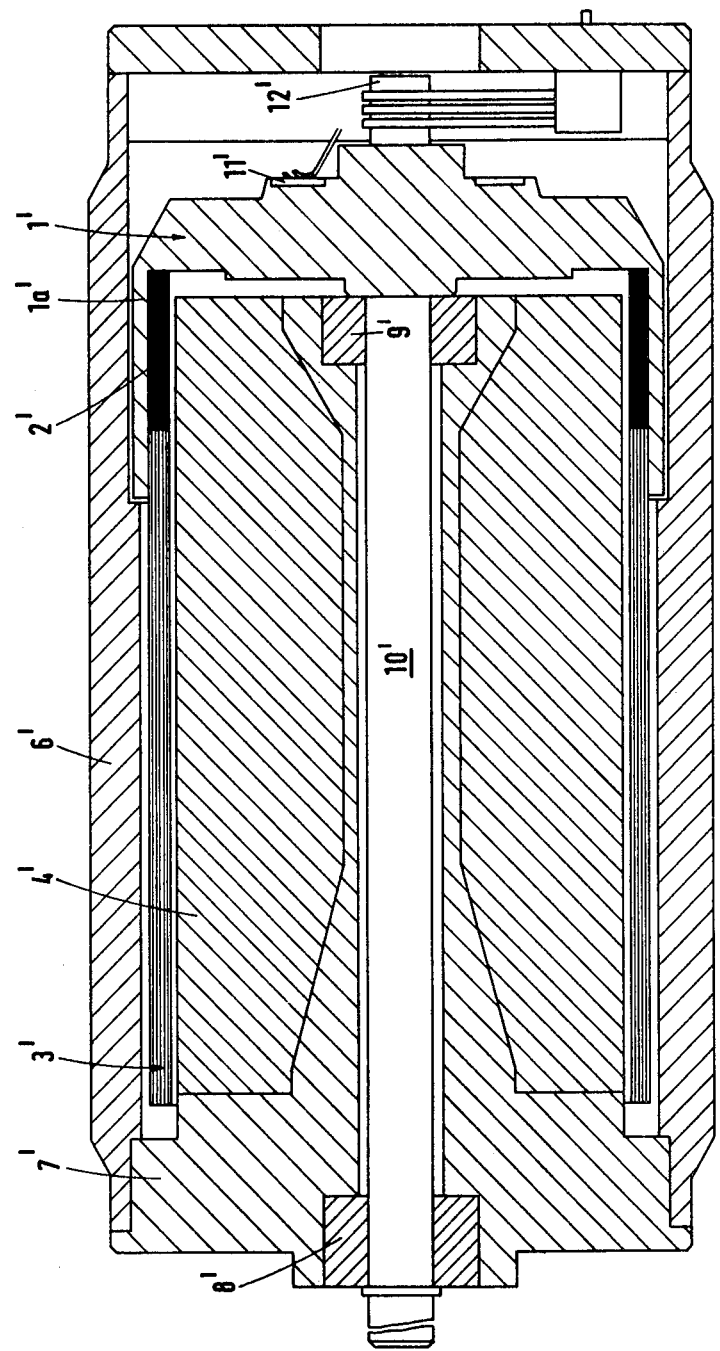
Figure 3:
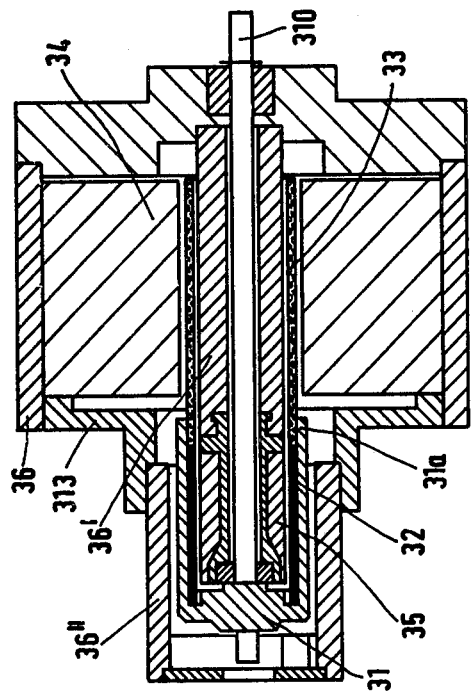
Figure 4B:
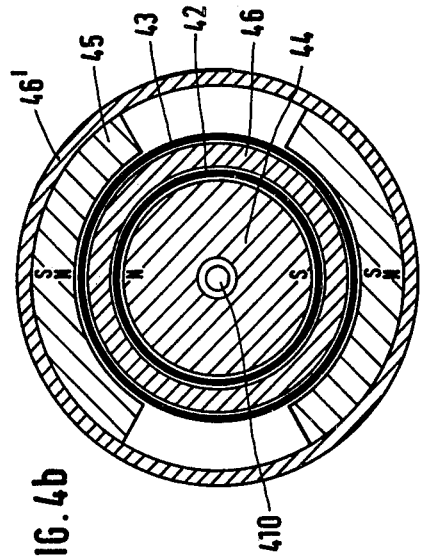
Figure 4A:
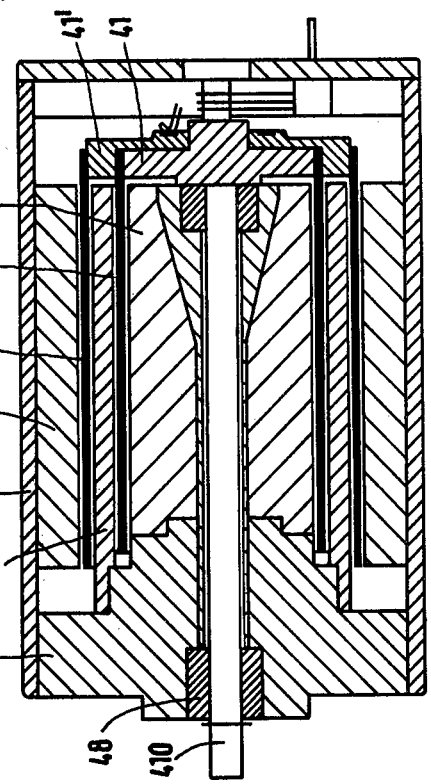

The present invention will be better understood by referring to the description of different practical embodiments and to the attached drawings in which:

FIG. 1 is an axial section of the first embodiment,
FIG. 2 is an axial section of a motor-generator similar to that of FIG. 1,
FIG. 3 is an axial section of another embodiment of the invention and
FIGS. 4a and 4b are respectively axial and radial sections of still another embodiment.

The rotor of the motor-generator represented in FIG. 1 comprises mainly a flange 1, a generator winding 2 and a motor winding 3. The flange 1 has a tubular coaxial extension 1a which supports both windings. The generator winding 2 is entirely supported by the outer surface of the flange and its tubular extension, while the axially adjacent generator winding is only supported on one of its ends by the end of the tubular extension 1a of the flange, the remaining part of the winding being self-supporting. The structure and the practical realisation of those windings is well known in the art and therefore not described in more detail here.

The stationary magnetic circuit of the motor-generator of FIG. 1 comprises two permanent magnets 4 and 5 located inside the cup-shaped rotor, a cylindrical housing part 6 surrounding the rotor and made from magnetically conductive material, and a supporting part 7. The supporting part 7 has the shape of a flange provided with an axially extending core part, the flange closing the housing part 6 and the core part supporting the two permanent magnets 4 and 5. Supporting part 7 has an axial hole with bearings 8 and 9 mounted around both ends thereof for supporting the axis 10 of the rotor. Furthermore the represented motor-generator includes two collectors 11 and 12 which are each associated to a respective one of the windings 2 and 3 and can be realised for instance as shown in Swiss patent No. 576,203.

Permanent magnets 4 and 5 are magnetized in the same way and have each at least one pair of diametrally opposite poles, the magnetized parts of the magnets 4 and 5 being aligned with each other in axial direction. In this embodiment the provision of separated magnets has only the purpose of simplifying the manufacturing thereof in particular in view of the slightly different radial dimension thereof. As shown in FIG. 1, magnet 4 has a slightly larger outer diameter than magnet 5, the latter being surrounded by the tubular extension 1a of flange 1. The shown structure provides a substantially constant radial clearance between the rotor and the stator over practically the whole length of both windings.

The magnetic flux generated by magnets 4 and 5 crosses the windings 2 and 3 and has its path closed through the housing part 6. The parts of the flux which respectively pass through the two windings are practically separated in axial direction and therefore an inductive coupling of both windings is avoided.

FIG. 2 shows an embodiment which is very similar to that of FIG. 1 and the corresponding parts have been designated by the same basic numerals. In this embodiment the tubular extension 1'a of the rotor flange 1' surrounds a corresponding part of the windings. The larger part of motor winding 3' is here also self-supporting. Permanent magnet 4' can in this case be made of one piece, while the housing part 6' has a slightly larger inner diameter on the part of its length which faces the tubular extension 1'a of the rotor flange.

FIG. 3 shows an embodiment in which separated permanent magnets are provided for the generator part and for the motor part of the machine. The rotor of this motor-generator is similar to that of FIG. 2, a flange 31 having a tubular extension 31a to support two axially adjacent windings 32 and 33. Winding 33 is substantially self-supporting and forms the motor winding. The stationary magnetic circuit of the motor part of the machine includes an annular permanent magnet 34 which surrounds the corresponding section of the rotor, as well as an outer annular part 36 surrounding magnet 34 and a core part 36' located inside the rotor, both parts 36 and 36' closing the motor part of the magnetic circuit.

The generator part of the machine has an annular permanent magnet 35 located inside the rotor and having the same diameter as part 36'. The whole stationary part located inside the rotor has an axial bore through which passes the rotor shaft 310. The generator winding is surrounded by a housing part 36" of permeable magnetic material, the housing parts 36 and 36" being connected by a supporting part 313 of non magnetisable material.

The embodiment of FIG. 3 thus has two separated stationary magnetic circuits which provide a separation of the magnetic fluxes passing through the motor winding on the one side and the generator winding on the other side. Due to the fact that the motor magnet 34 is placed outside the rotor, this magnet can be of sufficient size for producing a suitable torque without giving the rotor a large diameter.

FIGS. 4a and 4b show still another embodiment of a motor-generator according to the invention. In this embodiment both windings are not arranged in axially adjacent relationship as previously, but are coaxial with a radial spacing therebetween. The axial section of FIG. 4a shows a supporting flange comprising two parts 41 and 41' for supporting the ends of two windings 42 and 43 which for the remaining part are self-supporting. Between the two windings an annular space is provided resulting from the difference in their diameters. The stationary magnetic circuits of this motor-generator comprises four parts namely: a cylindrical magnet 44 located inside winding 42 of smaller diameter, a tubular part 46 located in the annular space between windings 42 and 43, an annular magnet 45 surrounding the outer winding 43 and a housing part 46' made of magnetically permeable material which surrounds and supports the outer magnet 45. The said four parts of the stator are fixed on a supporting flange 47 which closes one end of the housing part 46' and supports one of the bearings 48 in which the rotor shaft 410 is supported in the machine.

FIG. 4b is a cross section of the machine of FIG. 4a and shows in particular the magnets 44 and 45 being in this example bipolar magnets. The magnetic fluxes which pass through the motor winding 43 on the one side and through the generator winding 42 on the other side have their paths closed through the common stationary part 46 but do not pass through the other one of the respective windings. It results therefrom that this arrangement also provides a separation of the fluxes of the motor part and of the generator part of the machine and avoids an inductive coupling between the respective windings.

Various constructional variations can be made in the shown embodiments without departing from the spirit of the invention. In particular the permanent magnets can have a greater number of poles and the windings can be made and supported in different forms. For instance in place of the tubular extension 1a of the flange 1 in FIG. 1, a thin layer of plastics material can be provided on the outer surface of two axially adjacent windings such as 2 and 3 to assemble the two windings and to realize a self-supporting structure.

What is claimed is:

1. A direct-current motor-generator which comprises at least one stationary magnetic circuit including a permanent magnet and having an air gap of substantially cylindrical shape, and a generally cup shaped rotor bearing a motor winding and a generator winding, wherein the spatial arrangement of the magnetic circuit and of the windings is such that during operation one of the windings cuts one portion of a magnetic flux path of the magnetic circuit and the other of the windings cuts another portion of said flux path.

2. A direct-current motor-generator as claimed in claim 1, wherein the said windings are coaxially arranged, axially adjacent winding packages of equal diameter.

3. A direct-current motor-generator as claimed in claim 2, wherein the rotor comprises a flange with a tubular axially extending part, the said tubular part bearing on its outer surface the generator winding and an axially adjacent part of the motor winding.

4. A direct-current motor-generator as claimed in claim 2, wherein the rotor comprises a flange with a tubular axially extending part, the said tubular part surrounding and bearing the generator winding and an axially adjacent part of the motor winding.

5. A direct-current motor-generator as claimed in claim 2, wherein the windings are provided with a common envelope in the form of a thin supporting layer of plastics material.

6. A direct-current motor-generator as claimed in claim 2 with a stationary magnetic circuit comprising at least two parts located in radial direction on either side of the rotor, wherein the said air gap is of substantially constant width over the whole axial extension of the windings, at least in the vicinity of the stator poles.

7. A direct-current motor-generator as claimed in claim 1, wherein the said windings are disposed coaxially in radially spaced relationship and a tubular part of the stationary magnetic circuit is extending inside the annular space between the windings, air gaps being formed on either side of the said tubular part between the same and parts of the magnetic circuit disposed inside and outside the rotor.

8. A direct-current motor-generator as claimed in claim 2, wherein two magnetic circuits are provided each comprising a permanent magnet and an air gap for the respective one of the said windings.

9. A direct-current motor-generator as claimed in claim 8, wherein one magnet is surrounding the motor winding and one magnet is placed inside the rotor under the generator winding, parts of magnetic conductive material being arranged to close the respective magnetic circuits separately.

* * * * *